United States Patent [19]

Feinbloom et al.

[11] Patent Number: 4,946,257

[45] Date of Patent: Aug. 7, 1990

[54] TELESCOPE HAVING A REMOVABLE HOLDING RING ASSEMBLY

[75] Inventors: Richard E. Feinbloom; Thomas Sacks, both of New York, N.Y.

[73] Assignee: Designs for Vision, Ronkonkoma, N.Y.

[21] Appl. No.: 327,613

[22] Filed: Mar. 23, 1989

[51] Int. Cl.⁵ .......................... G02B 7/02; G02B 23/00
[52] U.S. Cl. .................................... 350/321; 350/245; 350/246; 350/248; 350/537
[58] Field of Search ............... 350/245, 246, 248, 547, 350/537, 453, 249, 507, 321; DIG. 63/132, 15.4, 15.45, 15.5, 1.1

[56] References Cited

U.S. PATENT DOCUMENTS

| | | | |
|---|---|---|---|
| D. 206,684 | 1/1967 | Bevilacqua | 350/248 X |
| 672,179 | 4/1901 | Porter | 350/248 |
| 1,025,057 | 4/1912 | Hampson | 350/248 |
| 1,536,365 | 5/1925 | Wiseman | 350/248 |
| 1,584,519 | 5/1926 | Dritz | 350/248 |
| 1,668,283 | 5/1928 | O'Meara | 350/246 |
| 2,100,239 | 11/1937 | Carlton | 350/248 |
| 3,428,286 | 2/1969 | Del Pesco | 350/248 |

Primary Examiner—Bruce Y. Arnold
Assistant Examiner—David R. Parsons
Attorney, Agent, or Firm—Arthur L. Plevy

[57] ABSTRACT

A telescope housing has a removable finger accommodating ring secured thereto. The ring is coupled to the housing by a V-shaped spring member which is inserted into a channel member located on the telescope housing. In this manner, various telescope assemblies of different magnification can be accommodated by the use of the removable ring which also enables convenient storage.

9 Claims, 1 Drawing Sheet

TELESCOPE HAVING A REMOVABLE HOLDING RING ASSEMBLY

BACKGROUND OF THE INVENTION

This invention relates to a telescope and more particularly to a telescope housing held via a finger accommodating ring.

Reading telescopes are telescopic systems designed for occupation and reading distances. They allow an increased working distance from that which is found with a comparably powered microscope (reading lens) while still maintaining adequate magnification levels. Essentially many people in various occupations utilize such telescopes to perform tasks requiring increased visual acuity. The usefulness of these units; however; should not be considered limited to low vision patients. Anyone who requires more than normal visual acuity would benefit from such telescopic aids.

There are many different types of reading telescopes which are available and these telescopes are provided in various magnifications such as for example 2 to 8 times magnification or more, and such telescopes can be focused at any working distance. As one can ascertain, a telescope is often said to enlarge things or bring objects nearer. Actually a telescope decreases the visual angle. In principle all refracting telescopes comprise an objective which is directed towards the object to be observed and an ocular (eyepiece), to which the observer applies his eye. The rays coming from the distant object are almost parallel and they converge to form an image at the focus of the objective lens.

There are many different types of telescopes such as the Galilean, which was named after Galileo, and in such a telescope the ocular is a diverging lens. Other telescopes, designated as Keplerian telescope have a convergent lens for its ocular. As is known, telescopes are widely employed to enhance visual acuity as indicated above.

In order to utilize a telescope efficiently, it is convenient to have the telescope supported by means of a ring through which a finger of the user is inserted. When the telescope is not being used it is desirable to have the ring removable so that the entire unit can be compactly stored or transported. The use of a removable ring also allows the user to employ and interchange telescopes of different powers.

SUMMARY OF THE INVENTION

A telescope apparatus comprising a telescope assembly housing containing an ocular and objective lens, a finger accommodation ring assembly and means for removably coupling said ring to said housing for enabling a user to insert his finger through said ring for viewing via said telescope in a first mode and to remove said ring from said housing in a second mode.

DETAILED DESCRIPTION OF INVENTION

Figure 1:
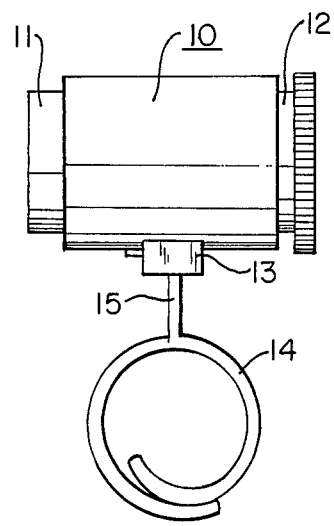
FIG. 1 is a side plan view of a telescope having a removable holding ring according to this invention.

Referring to FIG. 1, there is shown a side plan view of a telescope assembly and housing 10. The telescope assembly 10 consists of three cylindrical housings, namely a central housing 10, an ocular housing 11, which contains the ocular or eyepiece lens and an objective housing 12 which is slidably movable with respect to the housing 10 and the ocular section 11 to enable focussing of the same. Essentially such telescopes, as indicated above, may be utilized for various purposes to improve visual acuity and may have magnification powers up to 8 times or more. Such telescopes are relatively small and basically may be a few inches in length with diameters of ½ to 1½ inches.

As seen in FIG. 1 the central housing 10 of the telescope has a bracket or latch means 13 mounted thereto. Inserted into the bracket by means of a spring like coupling mechanism is a ring 14 which is coextensive and integrally formed with a central post 15. The ring 14 is dimensioned to accommodate a finger of a user and is adjustable in diameter to accommodate different users. The post 15, as will be shown, contains a spring or clip mechanism for removably securing the ring 14 to the housing 10 via the bracket 13. As seen, the ring 14 is adjustable as consisting of a formed rod bent into a circle with the ends of the rod abutting against one another to provide adjustability by varying the diameter of the ring.

Figure 2:
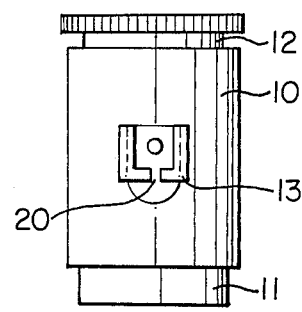
FIG. 2 is a bottom plan view of the telescope assembly showing a latch for accommodating the holding ring.

As seen in FIG. 2, the bracket 13 includes two flanges positioned on a right and left side of the bracket and a central aperture 20 to accommodate the post 15 of the ring when inserted therein.

Figure 3:
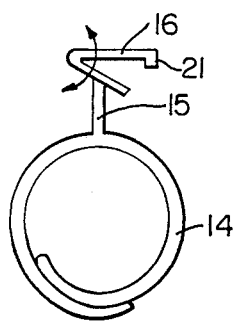
FIG. 3 is a side plan view of a holding ring and associated locking mechanism according to this invention.
Figure 4:
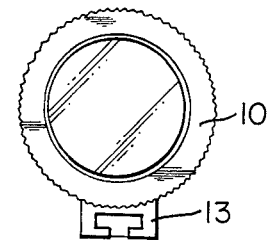
FIG. 4 is a front plan view showing the telescope assembly with the latch means.

Referring to FIG. 3, there is shown a side view of the ring 14. As indicated, the ring 14 is fabricated from a suitable metallic material and is adjustable. The overlapping ends can be moved with respect to one another to provide adjustment according to the finger size. This means of adjustment is well known in the art.

Secured to or integrally formed with the adjustable ring member 14 is the post 15. Secured to the top of the post 15 is a V-shaped spring member 16. The V-shaped member 16 is fabricated from metal and is compressible as shown in the direction of the arrows. This member 16 is inserted within the channel of the member 13 and held in place due to the compression of the V-shaped member 16 as provided by the channel in the member 13. In this manner the ring can be inserted into the channel with the V-shaped member 16 being compressed by the channel. Thus the entire ring is secured within the latch member 13 by means of compressive forces. The member 16 tends to spring back to its original shape after insertion into the channel associated with the latch member 13 and this action secures the member 16 within the latch 13. In order to remove the ring from the telescope assembly, one merely pushes the ring up and pulls back. The end flange 21 associated with the V-shaped locking member 16 is used to facilitate the insertion of the ring into the channel.

Figure 5:
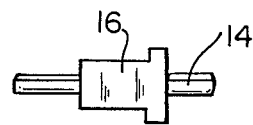
FIG. 5 is top plan view showing the holding ring assembly of FIG. 3.

FIG. 5 shows a top view of the ring and latching member 16. The main utilization of the apparatus is to enable one to remove the ring from the telescope assembly as desired. This accommodates easy storage and further enables one to utilize different telescope assemblies with different magnification powers without providing a new ring. In this manner the fact that the holding ring assembly is removable enables one to accommodate many different telescopes with various magnifications and further makes it easier for shipment and storage.

What is claimed is:

1. A telescope apparatus comprising:
   a telescope assembly housing containing an ocular and objective lens;
   a finger accommodation ring assembly; and
   means for removably coupling said ring to said housing for enabling a user to insert his finger through said ring for viewing via said telescope in a first mode and to remove said ring from said housing in a second mode;
   said means including a latch coupled to said telescope housing, and having a channel with an opening, and a spring member coupled to said ring assembly for insertion of said spring member in said channel to removably secure said ring to said housing.

2. The telescope apparatus according to claim 1 wherein said ring assembly is adjustable in diameter.

3. The telescope apparatus according to claim 1 wherein said telescope assembly is a Galilean telescope.

4. The telescope apparatus according to claim 1 wherein said telescope assembly is a Keplerian telescope.

5. The telescope apparatus according to claim 1 wherein said telescope assembly provides a magnification between 2–10 times.

6. The telescope apparatus according to claim 1 wherein said ring assembly comprises a single rod of metal formed as a ring with the ends of said rod abutting one another to enable the diameter of said ring to be adjusted.

7. The telescope apparatus according to claim 1 wherein said spring member is a V-shaped member having one arm coupled to said ring assembly and the other arm adapted to flexibly move with respect thereto.

8. The telescope apparatus according to claim 7 wherein said V-shaped member further includes a descending flange coupled to said other arm of said V-shaped member to aid inserting said member in said channel.

9. The telescope apparatus according to claim 7 wherein said ring assembly further includes a post extending from said ring assembly with said V-shaped spring member secured to said post.

* * * * *